(12) United States Patent
Okunola et al.

(10) Patent No.: US 10,035,947 B2
(45) Date of Patent: Jul. 31, 2018

(54) METHOD FOR CHEMICALLY CONTROLLING DELAY TIME FOR BREAKING POLYMERS

(71) Applicant: SANJEL CANADA LTD., Calgary (CA)

(72) Inventors: Ayodele Okunola, Calgary (CA); Dawn Friesen, Calgary (CA); Sally Lawrence, Calgary (CA)

(73) Assignee: LOS ACQUISITION CO. I LLC, Denver, CO (US)

( * ) Notice: Subject to any disclaimer, the term of this patent is extended or adjusted under 35 U.S.C. 154(b) by 0 days.

(21) Appl. No.: 15/068,134

(22) Filed: Mar. 11, 2016

(65) Prior Publication Data

US 2016/0264850 A1    Sep. 15, 2016

Related U.S. Application Data

(60) Provisional application No. 62/133,065, filed on Mar. 13, 2015.

(51) Int. Cl.
| *C09K 8/68* | (2006.01) |
| *C09K 8/88* | (2006.01) |
| *C09K 8/90* | (2006.01) |
| *E21B 43/26* | (2006.01) |

(52) U.S. Cl.
CPC ........... *C09K 8/68* (2013.01); *C09K 8/88* (2013.01); *C09K 8/90* (2013.01); *E21B 43/26* (2013.01); *C09K 2208/26* (2013.01); *C09K 2208/28* (2013.01)

(58) Field of Classification Search
None
See application file for complete search history.

(56) References Cited

U.S. PATENT DOCUMENTS

| 4,144,179 A | 3/1979 | Chatterji |
| 4,552,674 A | 11/1985 | Brown et al. |
| 4,552,675 A | 11/1985 | Brown et al. |
| 4,591,443 A | 5/1986 | Brown et al. |
| 4,610,795 A | 9/1986 | Norris et al. |
| 5,358,043 A | 10/1994 | Moradi-Araghi |
| 6,983,801 B2 | 1/2006 | Dawson et al. |
| 7,621,335 B2 | 11/2009 | Valeriano et al. |
| 8,575,073 B2 | 11/2013 | Ali et al. |
| 8,575,075 B2 | 11/2013 | Huang |
| 2014/0221256 A1 | 8/2014 | Holtsclaw et al. |
| 2016/0312109 A1* | 10/2016 | Li ..................... C09K 8/665 |

FOREIGN PATENT DOCUMENTS

WO    WO 2015103203 A1 *  7/2015  ............. C09K 8/685

OTHER PUBLICATIONS

Carman P.S. et al.; Successful Breaker Optimization for Polyacrylamide Friction Reducers Used in Slickwater Fracturing; 2007 SPE Hydraulic Fracturing Technology Conference, Texas, USA, Jan. 29-31, 2007.

* cited by examiner

*Primary Examiner* — John J Figueroa

(57) ABSTRACT

A breaker system for a fracturing fluid having a polymer, includes an oxidative polymer breaker which includes water, a persulfate and a transition metal chelate having more than one accessible oxidation state, which inhibits or delays the break of the polymer by the breaker.

7 Claims, No Drawings

METHOD FOR CHEMICALLY CONTROLLING DELAY TIME FOR BREAKING POLYMERS

FIELD OF THE INVENTION

This invention relates to delayed polymer degradation reactions designed to reduce average molecular weight of natural and synthetic polymers used in oilfield applications.

BACKGROUND

Subterranean formations are often stimulated to facilitate increased production of hydrocarbons. Fracturing methods use a fracturing fluid at a pressure sufficient to create a fracture or extend existing fractures in the formation. If a proppant is employed, the goal is generally to create a proppant filled zone from the tip of the fracture back to the wellbore. The hydraulically induced fracture is more permeable than the formation and it acts as a pathway or conduit for oil in the formation to flow to the wellbore and then to the surface. These methods of fracturing are well known and while subject to significant variation, most follow a similar general procedure.

The fluids used as fracturing fluids in such formations are typically fluids that have been viscosified to facilitate fracturing and proppant transport. Viscosification of the fluid is typically achieved through the addition of natural or synthetic polymers, which may or may not be cross-linked. The viscosifying polymer may be a solvatable or hydratable polysaccharide, such as guar. Alternatively, a viscoelastic surfactant may be used to viscosify the fracturing fluid. In either case, such fracturing fluids are relatively costly due to the expense of the various components and additives used.

Amounts of the viscosified fluids can leak off into the formation and may reduce the relative permeability in the invaded region after the treatment. Cleanup of these fluids is therefore an important consideration, which may add to the cost of treatment. Even with effective cleanup, there is always the potential that some formation damage will remain. Therefore, breaker systems are commonly used to reduce the viscosity of the fracturing fluid, and allow removal of the fracturing fluid. Guar may be degraded enzymatically or by oxidative chemistry, and commercially available breaker systems are known to those in the art.

In so-called tight shale or sand formations, fracturing with conventional viscosified fracturing fluids may not be practical due to the expense and risk of damage to the already low permeability of the formation.

Tight shale or sand formations are often stimulated using slickwater fracturing where water is combined with a friction reducing agent, typically a polyacrylamide polymer, and is introduced into the formation at a high rate to facilitate fracturing the formation. Tight shale or sand formations are naturally fractured to some degree, and slickwater fracturing is believed to join natural fractures together to form extended, branched fracture networks. In other formations, slickwater fracturing fluids may produce longer, although more narrow fractures, and also use lighter weight and significantly lower amounts of proppant than conventional viscosified fracturing fluids. Accordingly, slickwater fracturing fluids are particularly useful in low-permeability, gas-bearing formations, such as tight-gas shale and sand formations. The slickwater fracturing fluids may be brine or fresh water, depending upon the properties of the formation being treated, and may also require less cleanup than conventional viscosified fracturing fluids.

While slickwater fracturing fluids may require less cleanup than conventional viscosified fluids, there is still the possibility of fracture or formation damage from the friction-reducing polymer, which typically is a high molecular weight polyacrylamide-based polymer, such as a polyacrylamide/2-acrylamido-2-methylpropanesulfonic acid (AMPS) co-polymer. Synthetic polymers such as polyacrylamides tend to be more difficult to break than natural polymers such as guar, due to differences in the structure of the polymer backbone.

It is known that persulfates or peroxygen compounds can be used to degrade or break synthetic polymers. Persulfates thermally decompose at elevated temperatures (≥35° C.), resulting in highly reactive sulfate radicals which initiate the oxidative degradation of the polymer backbone. It is also known to use metal activators to enhance the oxidative degradation of polymers.

When delay or control of polymer break is required, the most common method is to add the breaker compound as a solid which will dissolve slowly, or to use encapsulation methods. However, fracturing operations tend to be set up for the addition of liquid additives and the metering of solid additives can be inaccurate and result in inconsistent chemical loadings which can cause job failures.

There remains a need in the art for a method of breaking both natural and synthetic polymers in a time controlled manner across a range of temperatures.

SUMMARY OF THE INVENTION

In one aspect, the invention comprises a fracturing fluid breaker system using oxidative degradation of polymer to reduce polymer average molecular weight, which degradation is delayed by an inhibitor system. Where the polymer is used to viscosify the fracturing fluid, breaking the polymer may result in an appreciable reduction in viscosity, and possibly friction. In a slickwater system, where the polymer is typically a friction reducing polymer and polymer loadings are at a relatively low level, a reduction in molecular weight may not necessarily result in a significant reduction in viscosity, and may in fact result in an increase in friction. The inhibitor system serves to delay and control polymer degradation.

In one embodiment, the breaker system comprises a persulfate and an inhibitor system comprising a transition metal coordination complex or chelate, with more than one accessible oxidation state. In one embodiment, the transition metal chelate may comprise an iron aminocarboxylate, such as ferric or ferrous methylglycinediacetic acid (MGDA) ethylenediaminetetraacetic acid (EDTA), or nitriloacetic acid (NTA). In one embodiment, the persulfate is a persulfate of sodium, ammonium or potassium.

DETAILED DESCRIPTION OF EMBODIMENTS

In one aspect, the invention comprises a polymer breaking system having an inhibitor system comprising a transition metal chelate with more than one accessible oxidation state, which delays the oxidative degradation of a polymer. Without restriction to a theory, it is believed that the chelate ligand modulates the reactivity of the transition metal, either electrochemically or sterically, or both. It is also believed that in the presence of active sulfate radicals, the degradation of the polymer is hindered by the presence of transition metal chelate. This inhibition may be sustained by the preferential oxidation of the transition metal center from a lower to a higher oxidation state, thereby kinetically inhibiting the oxidative degradation of the polyacrylamide by the sulfate radicals. The kinetic inhibition is demonstrated as a combination of a time delayed onset of viscosity reduction and a slower rate of viscosity reduction. Therefore, in general terms, the invention comprises a polymer breaker system which comprises a persulfate and an inhibitor system comprising a transition metal coordination complex or chelate, wherein the transition metal has more than one accessible oxidation state.

Persulfates can rapidly degrade polymers but the reaction occurs immediately, particularly as the temperature increases. The addition of the inhibitor system allows the reaction timescale to be controlled. While metal-based activation complexes are known and used to accelerate polymer breaking using peroxygen compounds, the present invention is directed to the inhibition and subsequent delay of polymer breaking using a transition metal complex or chelate. The transition metal complex has multiple accessible oxidation states so that it can be regenerated at a lower oxidation state and act in a somewhat catalytic manner to inhibit the oxidizing breaker.

The term "persulfate" (sometimes known as peroxysulfate) refers to ions or compounds containing the anions $[SO_5]^{2-}$ or $[S_2O_8]^{2-}$. The anion $[SO_5]^{2-}$ contains one peroxide group per sulfur center, whereas in $[S_2O_8]^{2-}$, the peroxide group bridges the sulfur atoms. In both cases, sulfur adopts the normal tetrahedral geometry typical for S(VI) oxidation state.

As used herein, a "transition metal" is a metal which has incompletely filled d orbitals or forms one or more stable cations with an incomplete d orbital. Transition metals include so-called first row transition metals such as iron, manganese, cobalt, copper, nickel, zinc, vanadium, titanium, chromium, vanadium, and scandium. Of these, all are known to have at least two oxidation states except for zinc and scandium. While other oxidation states are known for zinc and scandium, they are rare, and their chemistry is dominated by Zn(II) and Sc(III)). While Zn is not technically a transition metal because it always has a d10 configuration, and as a cation it loses electrons from the 4s orbital, it may be considered to be a transition metal for the purposes of this invention.

In one embodiment, the transition metal coordination complex comprises iron complexed with a metal chelating agent such as methylglycinediacetic acid (MGDA) ethylenediaminetetraacetic acid (EDTA), or nitriloacetic acid (NTA), each of which is readily commercially available, such as Trilon™ (BASF) for example. The iron will have more than one accessible oxidation state, such +2 (ferrous) and +3 (ferric). Accordingly, the inhibition of the oxidizing agent may be sustained by the preferential oxidation of the metal from a lower to a higher oxidation state by the sulfate radicals, thereby kinetically inhibiting the oxidative degradation of the polymer by the sulfate radicals. The kinetic inhibition can be evidenced by a combination of a time delayed onset of polymer degradation and a slower rate of polymer degradation, which may be evidenced by viscosity reduction. The overall time delayed degradation may be controlled by inhibitor loading, oxidizer loading and temperature. Polymer composition may also play a role in observed degradation rate.

In another embodiment, the transition metal chelate may comprise copper, either alone or in combination with iron or another transition metal.

In one embodiment, the persulfate is the source of active sulfate radicals, and may be a persulfate of sodium, ammonium or potassium.

In another aspect, the invention comprises a fracturing fluid system which comprises a non-ionic, cationic or anionic polymer and a delayed breaker system. The breaker system causes a delayed onset of active degradation of the polymer. The polymer may comprise a polyacrylamide or polyacrylamide-based polymer such as a polyacrylamide copolymer, a polysaccharide such as a galactomannan (guar or guar derivatives), or a cellulose derivative such as hydroxymethylcellulose, hydroxyethylcellulose, or carboxymethylhydroxypropyl guar (CMHPG).

Polymer degradation is essentially a change in the physico-chemical properties of a polymer or polymer-based product under the influence of one or more environmental factors such as heat, light or chemicals such as acids, alkalis, other oxidizing agents and some salts. The changes in properties range from physical properties such as tensile strength, color, shape to chemical properties such as molecular weight or chemistries.

Polymer degradation is a scission process during which the polymer chains are cleaved to form oligomers and finally to form monomers. The chemical degradation of water-soluble polymers used in fracturing fluids conventionally proceeds by enzymes or oxidizing agents. Enzymatic degradation is only effectively available for naturally occurring biopolymers like polysaccharides, proteins (gelatin and collagen) and poly (β-hydroxy acids). The most important mode of degradation of synthetic, water-soluble polymers is by an oxidative process where oxidizers form free radicals in solution, a process which may also be temperature or pH dependent.

Polymer degradation can be monitored by a number of parameters, the most important of which is average molecular weight. Other parameters include loss of mechanical strength, viscosity and monomer release, all of which are related but need not necessarily follow the same kinetics. Average molecular weight of a polymer may be determined by methods well known in the art, including number average methods or weight average methods, or any other other suitable method.

The known degradation mechanisms for synthetic polymers such as polyacrylamide and its copolymers are thermal, photo-degradation, biological and chemical. In embodiments of the present invention, polyacrylamide-derived polymers are degraded by a chemical method, primarily by oxidation of the polymer backbone. Oxidation of many polymers occurs by a free-radical, chain mechanism. The rate at which different polymers oxidize and the extent of the reaction is influenced both by the physical and the chemical structure of the particular polymer. Important morphological changes may also occur as a result of oxidation.

The free radical oxidative degradation of polyacrylamides has been well studied. It is generally known that the average molecular weight of polyacrylamides is reduced by a free radical mechanism in the presence of peroxides. Controlling factors such as temperature, concentration of polyacrylamide and peroxide, original molecular weight of polyacrylamide and peroxide characteristics have been identified as key elements in the degradation process, with an increase in each resulting in an increased degree of degradation. The degree of degradation has been found to be greatest with $K_2S_2O_8$ and least with $H_2O_2$. Initiating systems that produce higher concentrations of free radicals do not necessarily cause more degradation, as the probability of radical-radical termination processes will also be increased.

Persulfates undergo a thermal decomposition at elevated temperatures to produce highly reactive sulfate radicals that attack the polymer, reducing its average molecular weight and viscosifying ability.

$$O_3S-O:O-SO_3^{2-} \rightarrow .SO_4- + .SO_4-$$  Equation 1

Thermal decomposition of persulfate.

$$Fe^{2+} + H_2O_2 \rightarrow Fe^{3+} + .OH + OH^-$$  Equation 2

Generation of hydroxyl radicals from the oxidation of $Fe^{2+}$ by $H_2O_2$.

$$.OH + PolyH \rightarrow Poly. + H_2O$$

$$Poly. + O_2 \rightarrow PolyO._2$$

$$2PolyO_2 \leftrightarrow Poly\text{-}O\text{-}O\text{-}O\text{-}O\text{-}Poly \rightarrow 2PolyO. + O_2$$

$$PolyO. \rightarrow Fragment_1. + Fragment_2$$

Degradation scheme of polyacrylamide by hydroxyl radical in the presence of oxygen.

The degradation scheme above depicts a stepwise chemically induced oxidative degradation of polyacrylamide by hydroxyl radicals under aerobic conditions. PolyH denotes polyacrylamide molecules with extractable hydrogens, Poly, $2PolyO._2$, and PolyO. denote lateral polymer macroradicals and the respective peroxyl and oxyl radicals. $Fragment_1$. and $Fragment_2$ are fragment radicals and stable fragments respectively formed as a result of the main chain scission.

In one aspect, the treatment fluids described herein may be used in any treatment method known to one skilled in the art. In one embodiment, the treatment fluid of the present invention is a fracturing fluid. Thus, in one embodiment, the invention comprises a method of fracturing a subterranean formation penetrated by a well bore, comprising the steps of (a) preparing a fracturing fluid system comprising a polymer and a breaker system comprising an oxidative polymer breaker comprising water, a persulfate and an effective amount of an inhibitor system comprising a transition metal chelate, with more than one accessible oxidation state; and (b) introducing the treatment fluid into a subterranean formation at a rate and pressure whereby fractures are formed in the subterranean formation. The inhibitor system delays the action of the persulfate on the polymer. In one embodiment, the polymer comprises a friction reducing polymer such as a polyacrylamide polymer or co-polymer. In another embodiment, the polymer comprises a viscosifying polymer such as guar.

As used herein, an "effective amount" of an inhibitor is an amount which effectively increases either the end point or the delay time of a breaker system, or both, by at least 50%, or preferably 100%, or more preferably 200% or more, under the same conditions as the breaker system without the inhibitor. The end point may be the length of time required to reach a point identified where sufficient degradation has occurred to achieve the desired results. The delay time may be the length of time during which significant degradation has not occurred as a result of the inhibitor.

In one embodiment, where polymer degradation is associated with a reduction in viscosity, the end point or fluid break time may be defined as the time required for fluid viscosity to drop below 1 cP following breaker addition. The delay time marked by the onset of viscosity break was considered as the point at which fluid viscosity dropped to 75% of the initial viscosity at the time of breaker addition. One skilled in the art will recognize that viscosity of a polymer solution is affected by polymer concentration and average molecular weight, as well as the shear rate of the measurement method.

Where polymer degradation does not result in significant viscosity reduction, end points and delay times may be measured by a reduction in number average or weight average molecular weight. In one embodiment, an end point may be the time required for average molecular weight to drop to 80, 70, 60 or 50%, or less than the starting average. The delay time may be the time required for the average molecular weight to reach 98, 95, 93, or 90% or less than the starting average.

Examples

The following examples are intended to be illustrative of embodiments of the invention, but not limiting of the claimed invention.

Aqueous solutions of a friction reducing polymer were prepared by placing 500 mL of Calgary tap water into a 1 L Waring blender jar and the blender speed was adjusted to give a low vortex in the fluid. The friction reducer (FR) polymer (1.25 mL of an AMPS-polyacrylamide copolymer, equivalent to 2.5 L/m³) was added to the water and allowed to mix at a low vortex for 10 minutes. This solution was transferred into a clean bottle for use in subsequent testing.

Persulfate breaker (oxidizer) solutions containing 5% w/w of sodium, ammonium, or potassium persulfate in distilled, deionized water were prepared and stored in amber glass bottles.

5% (wt/wt) sodium persulfate
5% (wt/wt) ammonium persulfate
5% (wt/wt) potassium persulfate The inhibitor used in the below examples was AOTech T™ (ORIN Technologies), which comprises iron MGDA chelate and used as received.

An OFITE Model 900 viscometer equipped with a B1 bob and sleeve, heating cup, and fluid thermocouple was connected to a computer running the manufacturer-provided ORCADA software. A measured portion of friction reducer solution (170 mL, containing 2.5 L/m³) was placed in the metal insert of the OFITE heating cup and raised into place for viscosity measurements. Using ORCADA software, the sample was sheared at 500 s⁻¹ and viscosity data collected every 5 seconds for the duration of the run. Key experimental time points (approximate) were as follows:

Fluid sample maintained at room temperature for 5 minutes to allow viscosity to stabilize
Heating stage started and set to desired target at t=5 min (Fluid allowed 50-55 min to reach test temperature)
AOTech T™ added at t=55 min (if applicable)
Breaker solution (oxidizer) added at t=60 min (if applicable)

Data collection was stopped once sample viscosity dropped below 1 cP and remained stable for at least 30 minutes, or if no significant change in viscosity was observed over a reasonable time period. In the tables below, fluid break time was defined as the time required for fluid viscosity to drop below 1 cP following breaker addition, and is described in the below examples as the "end point". The onset of viscosity break was considered as the point at which fluid viscosity dropped to 75% of the initial viscosity at the time of breaker addition and is described in the below examples as "delay time".

Comparison of Effect of Iron Chelate on Peroxide Versus Persulfate Breaker Solutions

TABLE 1

Delay times and end points for solutions treated with hydrogen peroxide, ammonium persulfate and sodium persulfate

|  | 35% $H_2O_2$ | | $(NH_4)_2S_2O_8$ | | $Na_2S_2O_8$ | |
|---|---|---|---|---|---|---|
|  | 1 | 2 | 3 | 4 | 5 | 6 |
| FR Loading (L/m³) | 2.5 | 2.5 | 5 | 5 | 2.5 | 2.5 |
| Oxidizer Loading (L/m³) | 5 | 5 | 2.5 | 2.5 | 5 | 5 |
| Inhibitor Loading (iron chelate) (L/m³) | 0 | 1 | 0 | 2.5 | 0 | 2.5 |
| Temperature (° C.) | 25 | 25 | 65 | 65 | 60 | 60 |
| Delay Time (minutes) | ∞ | 0 | 3.42 | 22.5 | 2.86 | 17.69 |
| End Point (minutes) | None | 17.37 | 24.09 | 124.78 | 11.61 | 74.94 |

As seen in Table 1, the iron chelate catalyzed the oxidation of the polyacrylamide based polymer at room temperature when hydrogen peroxide was used as an oxidizing breaker (from a complete lack of break (col. 1) to an instant break (col. 2)). However, the iron chelate material inhibited the breaking process when ammonium persulfate and sodium persulfate were used as oxidizing breakers. Delay times increased from 3.42 to 22.5 minutes and 2.86 to 17.69 minutes respectively, and end points increased from 24.09 to 124.78 minutes and 11.61 to 74.94 minutes respectively.

Use of Inhibitor Using Ammonium Persulfate as an Oxidizing Agent

TABLE 2

Delay times with ammonium persulfate and iron chelate inhibitor at different temperatures

|  | Temperature (° C.) | | | |
|---|---|---|---|---|
|  | 45 | 65 | 85 - Test 1 | 85 - Test 2 |
| FR Loading (L/m³) | 2.5 | 2.5 | 2.5 | 2.5 |
| Oxidizer Loading (L/m³) | 1.0 | 1.0 | 1.0 | 1.5 |
| Inhibitor Loading (iron chelate) (L/m³) | 2.5 | 2.5 | 5.0 | 2.5 |
| Delay Time (minutes) | ∞ | 60.5 | 21.8 | 2.83 |
| End Point (minutes) | ∞ | 180.22 | 94.05 | 8.08 |

As seen in Table 2, when temperature increased from 65° C. to 85° C., the delay time decreased from about 60 minutes, to less than 22 minutes, with a corresponding reduction in end point. Thus, at elevated temperatures, the inhibitory effect of the iron chelate is diminished.

Effect of Inhibitor Loading on Break Times

TABLE 3

Effect of inhibitor loading on polymer break times with 5% sodium persulfate breaker solutions

|  | Inhibitor Loading (L/m³) | | | |
|---|---|---|---|---|
|  | 0 | 1.5 | 2.5 | 5 |
| FR Loading (L/m³) | 2.5 | 2.5 | 2.5 | 2.5 |
| Oxidizer Loading (L/m³) | 5 | 5 | 5 | 5 |
| Temperature (° C.) | 60 | 60 | 60 | 60 |
| Delay Time (minutes) | 2.86 | 13.11 | 17.69 | 39.77 |
| End Point (minutes) | 11.61 | 51.02 | 74.94 | ∞ |

TABLE 4

Effect of inhibitor loading on polymer break times with 5% ammonium persulfate breaker solutions

|  | Inhibitor Loading (L/m³) | | |
|---|---|---|---|
|  | 0 | 1.5 | 2.5 |
| FR Loading (L/m³) | 5 | 5 | 5 |
| Oxidizer Loading (L/m³) | 2.5 | 2.5 | 2.5 |
| Temperature (° C.) | 65 | 65 | 65 |
| Delay Time (minutes) | 3.42 | 19.84 | 22.5 |
| End Point (minutes) | 24.09 | 124.51 | 124.78 |

As seen in Tables 3 and 4, the delay time increased with an increase in inhibitor loading for both sodium and ammonium persulfate breakers. However, there is not a substantial increase in the case of ammonium persulfate when inhibitor loading was increased from 1.5 to 2.5 L/m³.

Use of Inhibitor in Brine

TABLE 5

Use of inhibitor in brine solution

|  | Base Fluid - 3% NaCl Brine | |
|---|---|---|
| FR Loading (L/m³) | 5 | 5 |
| Oxidizer Loading (L/m³) | 2.5 | 2.5 |
| Inhibitor Loading (L/m³) | 0 | 2.5 |
| Delay Time (minutes) | 8.83 | 84.65 |
| End Point (minutes) | 10.58 | 105.65 |

As seen by the data in Table 5, inhibitor function is not affected by the presence of brine.

Inhibitor Effectiveness when Oxidizing a Natural Polymer

TABLE 6

Inhibitor effectiveness when breaking natural polymers

|  | CMHPG with $(NH_4)_2S_2O_8$ as Oxidizer | | | |
|---|---|---|---|---|
| CMHPG Loading (L/m³) | 2.5 | 2.5 | 2.5 | 2.5 |
| Oxidizer Loading (L/m³) | 2.5 | 2.5 | 5 | 5 |
| Inhibitor Loading (L/m³) | 0 | 5 | 0 | 5 |
| Temperature (° C.) | 65 | 65 | 65 | 65 |
| Delay Time (minutes) | 1.35 | 6.83 | 0.82 | 2.38 |
| End Point (minutes) | 13.43 | 79.58 | 13.06 | 33.96 |

Table 6 demonstrates the effectiveness of the inhibitor during the oxidative breaking of carboxymethylhydroxypropyl guar (CMHPG). A 2.5% or 5% (v:v) solution of ammonium persulfate was employed as the oxidative breaker. As seen from the data, the inhibitor is effective at controlling the break time of a natural polymer using ammonium persulfate. Delay times increased with the addition of inhibitor, as did the end point.

Interpretation and Definitions

The development of any actual embodiment may involve numerous implementation-specific decisions, each made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure.

As will be apparent to those skilled in the art, various modifications, adaptations and variations of the foregoing specific disclosure can be made without departing from the scope of the invention claimed herein. The various features and elements of the invention described herein may be combined in a manner different than the specific examples described or claimed herein without departing from the scope of the invention. In other words, any element or feature may be combined with any other element or feature in different embodiments, unless there is an obvious or inherent incompatibility between the two, or it is specifically excluded.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such aspect, feature, structure, or characteristic with other embodiments, whether or not explicitly described.

The singular forms "a," "an," and "the" include plural reference unless the context clearly dictates otherwise. It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation.

The terms "preferably," "preferred," "prefer," "optionally," "may," and similar terms are used to indicate that an item, condition or step being referred to is an optional (not required) feature of the invention.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by the skilled artisan, all numbers, including those expressing quantities of reagents or ingredients, properties such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range (e.g., weight percents or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, as used in an explicit negative limitation.

What is claimed is:

1. A breaker system for a fracturing fluid having a polymer, comprising an oxidative polymer breaker comprising water, a persulfate and an inhibitor system comprising a transition metal chelate which inhibits the oxidative breaking action of the persulfate on the polymer.

2. The breaker system of claim 1 wherein the transition metal has more than one accessible oxidation state.

3. The breaker system of claim 1 wherein the transition metal chelate comprises an iron aminocarboxylate.

4. The breaker system of claim 3 wherein the iron aminocarboxylate comprises iron methylglycinediacetic acid (MGDA) ethylenediaminetetraacetic acid (EDTA), or nitriloacetic acid (NTA).

5. The breaker system of claim 1 wherein the persulfate is a persulfate of sodium, ammonium or potassium.

6. The breaker system of claim 1 wherein the water comprises fresh water or brine.

7. The breaker system of claim 1 wherein the inhibitor system increases either an end point or a delay time of the breaker system, or both, by at least 50%, or 100%, or 200%, under the same conditions as the breaker system without the inhibitor system.

* * * * *